Dec. 18, 1934.　　T. A. BANNING, JR　　1,984,912
REFRIGERATING CAR
Filed Dec. 15, 1930　　3 Sheets-Sheet 1

Dec. 18, 1934.  T. A. BANNING, JR  1,984,912
REFRIGERATING CAR
Filed Dec. 15, 1930    3 Sheets-Sheet 2

Inventor:
Thos. A. Banning Jr.

Patented Dec. 18, 1934

1,984,912

UNITED STATES PATENT OFFICE 1,984,912

REFRIGERATING CAR

Thomas A. Banning, Jr., Wilmette, Ill., assignor to Pullman Car & Manufacturing Corporation, Chicago, Ill., a corporation of Delaware Application December 15, 1930, Serial No. 502,486

23 Claims. (Cl. 62—117)

This invention relates to refrigerating cars and the like, and to refrigeration as applied in other cases. The features of the invention have been devised with especial reference to the conditions existing in connection with refrigeration of cars, but it will presently appear that certain of the said features can be used with great advantage in other connections, and for other applications. Nevertheless said features have been devised with especial consideration for the requirements of car refrigeration.

Furthermore, the invention has especial applicability to the cooling of tank cars and the like, which are used for the transportation of gasoline and other volatile liquids, but this is only one application of the features of the invention.

The main object of the invention as respects the refrigeration or cooling of cars and the like is to provide a mechanical refrigerating system in which the refrigerating unit may be very conveniently driven from one of the truck axles. This will avoid the need of providing a special driving motor therefor, and will also eliminate the use of such devices as storage batteries, and all of the accessories which are needed in connection therewith. In connection with the driving of the refrigerating unit from one of the truck axles it is an object to provide a mechanical drive from the axle to the pumping unit of the refrigerating mechanism which drive will eliminate the use of belts and the like which are very objectionable for such locations. In place thereof I have provided an arrangement which establishes the drive from the axle to the pumping unit by means of a positive drive including a shaft connection between the parts.

In connection with the foregoing, it is a further object of the invention to provide a positive drive connection from the axle to the pumping unit in which connection the parts are so arranged that only a single bevel gear connection from the axle to the drive shaft is needed, such arrangement being possible by placing the shaft of the pumping unit longitudinally of the length of the car—that is—at right angles to the axle from which the power is derived. The drive shaft is then provided with universal joint connections and with a slip joint so that the necessary flexibility is provided to enable the parts to adjust themselves from time to time. This arrangement also makes it possible to mount the refrigerating unit directly on the bottom of the car body by which it is supported, and the universal joints and slip joint connections of the drive shaft permit the drive to be maintained and at the same time allow for turning of the truck on curves, and side sway and other movements of the truck relative to the car body.

The above ability to place the refrigerating unit directly on the car body while establishing the drive from the axle thereto is especially desirable in those cases in which the refrigerating medium is a noxious gas such as ammonia or sulphur dioxide or the like. These gases are compressed in the pumping unit and are then cooled so as to cause them to liquefy, and then the liquefied gas is delivered through the pressure pipe to the cooling unit which is located at the point where the refrigerating action is to be produced. There the liquefied gas is permitted to expand and gasify with consequent production of cooling action, and the expanded gas is then returned to the pumping unit to be again compressed and put through the cycle. The functioning of this system requires the use of a closed pipe circuit, and this circuit must be maintained tight at all times so as to avoid leakage and consequent loss of gas. In order to use this system it is very desirable to be able to eliminate any joints which are subject to relative movement, and therefore it is especially desirable to be able to mount the pumping unit directly on the car body, so that the pipe connections from and to said pumping unit may be made without any danger of leakage, and without the necessity of permitting the pipes themselves to flex as the car trucks turn and move relatively with respect to the car body. It will therefore be seen that I have provided a very desirable and advantageous relationship of parts by mounting the pumping unit directly on the car body, and by driving the same directly from the truck axle with the interposition of a drive shaft having the universal joints and the slip joint connection as previously set forth.

It is a further object of the invention to make provision for proper control of the refrigerating operation, taking into consideration the fact that the car movements may or may not coincide with the needed or desired functioning of the refrigerating mechanism. In this connection it will be understood that the refrigerating action depends on the expansion of the liquefied gas at the position of the cooling unit, and that the function of the pumping unit is to provide a supply of the liquefied gas available for such purpose. The demand for liquefied gas may be constant, according to the setting of the expansion valve, or it may vary from time to time, and this latter condition is true in those cases in which there is provided a thermostat regulation of the expansion valve. In any case however the pumping unit must function so as to provide the supply of liquefied gas available at all times for the expansion and cooling mechanisms.

In the present case in which the pumping unit is driven directly from the truck axle its functioning will depend on axle revolutions, and will therefore not be related to the functioning of the expansion valve and cooling mechanisms. There will be times when the car is travelling rapidly and when the action of the pumping unit will exceed the rate of demand of the cooling mechanisms etc., and there will be times when the car is travelling slowly or is standing still and when the rate of action of the pumping unit will be smaller than the demands of the cooling mechanisms. In order to level out the operations of the two units it is desirable to provide a storage tank within which a supply of the liquefied gas is maintained, the same being stored as delivered from the pumping unit, and being delivered to the cooling mechanisms as called for by them. Even with such an arrangement, however, there will still be times when the functioning of the pumping unit will exceed the rate needed, and when the tank will be filled to capacity. It is therefore desirable to make provision for controlling the pumping operations, and to do so either by disconnecting the pumping unit from the axle, or by other means which will make it unnecessary to actually disconnect the pumping unit from the axle, but will nevertheless discontinue or regulate the pumping action so that an excessive amount of pumping will not be produced. I have made such provision in the present case. The same serves to discontinue the pumping action in so far as the storage of the compressed liquid is concerned, so that when the pumping action is not needed it will be discontinued.

In connection with the foregoing, it should also be noted that when the pumping mechanism is functioning normally to compress the gas it places a very substantial load on the driving mechanism, in the present case, the car axle, since the pistons of the pumping mechanism must be forced up against the pressure of the gas. In those cases in which the pumping mechanism is at all times connected to the truck axle so that said mechanism must be brought into operation synchronously with the starting of the car and train it follows that this extra load due to the pumping mechanism must be reckoned with in addition to the load normally necessary to get the train under way. The starting of the train requires the overcoming of the frictional resistance at standstill, and this resistance is large, amounting to a very appreciable portion of the total drawbar pull which is ordinarily provided for the train. It is well understood that at starting the resistance is due entirely to the frictional resistance, and as the train commences to move this frictional resistance falls to a much lower amount than that at standstill. As the train speed increases the resistance to movement due to the windage becomes a more important factor, and this rises rapidly with train speed until it becomes the dominating factor. There is a speed at which the total resistance is a minimum, and this is usually at about eight or ten miles per hour in the case of cars equipped with the ordinary types of journal boxes not provided with roller or similar bearings. In the case of cars equipped with roller or other anti-friction bearings the speed of minimum resistance is something different from that in the case of the ordinary bearings, but in all cases there is a speed of minimum total resistance, and it will usually be at several miles per hour.

In order to reduce the starting resistance of the car as much as possible, and for other reasons it is desirable to make provision for cutting out the pumping action when the speed falls below the desired rate, and also for ensuring the recommencing of the pumping action when the speed again reaches and exceeds the rate referred to. I have provided such an arrangement in the present case. It serves to discontinue the pumping action when the speed is below the rate for which the device is set, and it again cuts the pumping mechanism into action when the speed rises to the proper rate; and this cut out mechanism is also so arranged that it functions in harmony with the refrigerating action of the device so that the pumping action is also regulated when necessary by the refrigerating mechanism according to the principles already set forth herein. That is to say, the pumping mechanism is subject to regulation by the speed of the car, and also by the refrigerating mechanism so that whichever of these conditions predominates at a given instant will control the pumping action. For example, in case the car is travelling at the rate at or above which the pumping action will be permitted, then the operation of the refrigerating mechanism will cut the pumping mechanism into and out of service from time to time as necessary to maintain the system in proper functioning condition; whereas in case the train speed falls below the critical rate the pumping mechanism is cut out of operation, and from that time forth and until the train speed again rises the pumping mechanism will remain cut out of service. The control is dual.

As a further feature of the foregoing I have provided an arrangement in which this control is effected by the use of a valve arrangement which serves when in one position to permit the pumping mechanism to function normally, drawing in the gas of low pressure from the supply line, and delivering the gas of high pressure to the delivery line; and which valve serves when in another position to connect the inlet and delivery ports or connections of the pump directly together so that the piston movements merely serve to move the gas back and forth between the inlet and delivery connections, but without any compressing action. In other words, when the valve is in this position it serves to "unload" the compressor, and then the piston movements will be effected without resistance or requirement for power other than that needed to overcome mechanical resistance. With this arrangement it is possible to "unload" the compressor without having to actually disconnect it from the truck axle, and at the same time the power required by the compressor will be reduced to a small fraction of that which it requires when functioning normally.

I have provided means for operating this "unloading" valve either by the rate of travel of the car, or by the operation of the refrigerating and cooling mechanism. In the latter case the pressure existing in the system may be used as a means for operating the "unloading" valve, and this pressure may be either that existing in the storage tank or delivery connection from the compressor, or in the return connection through which the expanded gas is returned to the compressor. I have provided arrangements which will function with either of the above mentioned conditions.

It is a further feature of the invention to provide for the cooling of the domes or upper portions of tank cars and the like, so that the vapors contained therein will be condensed and will drop back into the lower portions of the cars. By this means it is possible to prevent losses of the volatile materials such as gasoline and the like which are contained within the tank cars, since there will be no evaporation of them and discharge of the vapors through the vent valves of the domes; and at the same time it is an object to thereby prevent the rise of pressure within the tank which takes place when the vapor pressure rises due to rise of temperature. By keeping the dome cool the pressure within the tank car can be maintained substantially at atmospheric pressure, and thus dangers from explosions and the like will be eliminated, and also leakages will be avoided, and it will be possible to greatly reduce the upkeep and repair losses on such equipment. These results can also be secured without the necessity of heat insulating the entire body of the tank car, since the cooling of the dome will keep the interior pressure down, and since also the only place where the vapors can escape from the tank car is through the vent valves which are located in the dome.

It is a further object to accomplish the above results in such manner that the proper refrigerating action will be produced without any need of reicing or servicing the cars no matter how long they may be on the road. This is especially desirable in the case of tank cars used for the transportation of such materials as high test gas such as casing head gas, since, in case the refrigerant should be exhausted before the car reaches its destination the cooling action will cease, and the dangers from loss of vapors and from increase of pressure will again recur. By the present arrangement wherein the dome is cooled by means of a refrigerating mechanism which functions due to train or car movement, the refrigerating action will continue during practically all of the time consumed for the transportation of the material.

It is a further feature of the invention that there is provided a tank or container which retains a substantial amount of the liquid refrigerant so that the same is available to continue the refrigerating action during the intervals when the car is standing idle; and the arrangement is such that when the car is again under way at proper speed the refrigerating medium is liquefied so as to replenish that which was consumed during the interval of idleness of the car. Thus the refrigerating action may be made substantially continuous for an indefinite length of car travel, the periods of car idleness being made up by an excess of pumping action when the car is under way at proper speed so that the demand of the cooling mechanism for liquid refrigerating medium is met at all times and the cooling action is maintained constant at all times. This feature is not limited to tank car use but is also applicable to those cases where the invention is used for the refrigerating of other forms of cars.

It is also noted that the above feature is peculiarly related to the conditions existing in car operation, since the functioning of the pumping mechanism is dependent on the motion of the car, as distinguished from the ordinary arrangement of mechanical refrigerator, such as used for example in households. In the latter case the operation of the pumping mechanism may be directly controlled by the requirements of the cooling mechanism for liquefied gas, since the motive power for the pumping mechanism is usually electricity which is always available, and the supply of this motive power is not dependent on some other factor, but said motive power is always available for use and may be turned on and off at will; whereas in the present case the motive power for operating the pumping mechanism is the travel of the car along the road, and this travel is not in itself related to the need of the cooling mechanism for liquefied gas. There is therefore need for a supply of said liquefied gas sufficient to meet the intervals when the pumping action cannot be continued due to idleness of the car travel.

It is another feature of the present invention that in those cases in which the invention is used for the cooling of the domes of tank cars etc., the expansion valve and immediately related parts are placed in the upper portion of the dome where they are accessible for adjustment when the cover of the dome is removed, and without the need of the mechanic actually entering the dome or tank itself. This placement of these parts in the upper portion of the dome also brings them to the point where they are best located for the delivery of the expanding gas into and through the cooling coil which actually delivers the cooling action into the interior of the dome.

Other objects and uses of the invention will appear from a detailed description of the same, which consists in the features of construction and combinations of parts hereinafter described and claimed.

In the drawings;

Figure 1 shows a side elevation of the end portion of a tank car of ordinary construction, provided with a dome in its upper portion, and also provided with a cradle which is carried by the truck, and which cradle carries the refrigerating mechanism pumping and related mechanisms, the pump being belt driven from one of the truck axles; a portion of the car being sectioned;

Figure 2 shows a detailed section through the upper corner portion of the tank, showing the manner in which the pipes or tubes for the refrigerating medium may be entered and brought back through the same; Figure 2 being on enlarged scale as compared with Figure 1;

In the drawings I have shown the features of my invention as being applied to the case of a tank car, but as already explained certain of these features may be used and applied to equal advantage to the case of other cars to be refrigerated, and for that matter, certain of the features herein set forth may also be used to advantage in connection with mechanical refrigeration for other purposes than car refrigeration. It will therefore be understood that, except as I may hereinafter do so in the claims I do not intend to limit myself to refrigerating cars or any other specific application of the features of the invention.

With the foregoing in mind, the car includes the tank 10 which is mounted on the usual frame, and there are provided the usual end trucks, such as shown at 11 at the ends of the car. These trucks have the usual car wheels 12 and the usual axles 13. The tank car illustrated is also provided with the dome 14 in its upper central portion, which dome is provided with the usual vent valve 15. These vent valves are of familiar construction, and are so arranged that the gases or vapors within the car tank may be released to the outside air when the pressure within the tank exceeds an amount for which the vent valve is set. It is not deemed necessary to explain the construction or operation of these parts in further detail as they are well known and understood in the art of car construction.

I have provided means for cooling the dome by the use of a cooling coil or other suitable arrangement which is cooled by the use of refrigerating medium. This is the coil 16 shown in Figure 1. Said coil is suitably supported within the dome, and encircles the inner circumference of the dome, so that said coil does not materially interfere with the space within the dome, and in fact the coil has an inner diameter greater than the manhole opening 17 with which the dome is equipped. Said manhole opening is normally closed by means of a cover 18 which can be set and secured into place in gas tight fashion, and with sufficient firmness to withstand the internal pressures for which the tank car is intended.

The cooling coil 16 preferably includes a series of convolutions which commence at the top and circle downwardly as shown, so that by placing the expansion and control valve at the top end of the coil as shown at 19, the liquefied gas will expand therein and the cold gas will then flow down through the convolutions of the coil to the bottom of the coil, with a natural movement. Furthermore, by placing the expansion and control valve device 19 at the upper end of the coil, the valve thereof 20 may be easily accessible from the manhole opening when the cover has been removed therefrom, so that the desired adjustments of the refrigerating action may be easily made without having to actually get into the dome.

Figures 1, 2:
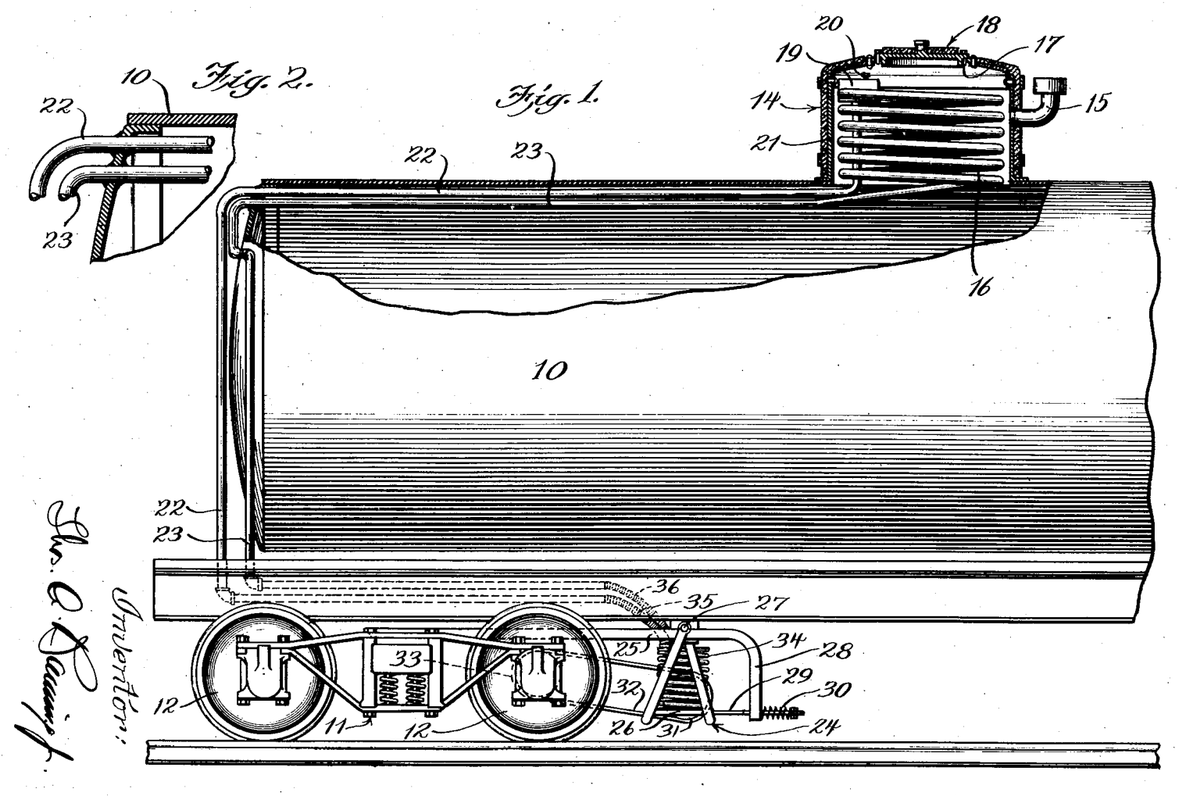

In order to conserve the refrigerating action with the dome as much as possible, and thereby improve the efficiency of the arrangement, I prefer to heat insulate the outside of the dome by a layer of insulating material such as 21 in Figure 1. This material may also be carried up and over the top portion of the dome, and the cover may also be heat insulated in order to still further improve the arrangement.

The liquefied gas tube or pipe is shown at 22, and the return or expanded gas tube or pipe is shown at 23. The former connects into the expansion valve or unit 19, and the latter connects from the lower or delivery end of the coil 16. These tubes or pipes are preferably carried endwise through the tank to one end thereof, and then are carried through the end of the tank as well shown in Figure 1. These tubes or pipes then extend down outside of the end of the tank to a point below the same, and are then carried back to points above the inner end of the truck.

There is a cradle 24 suspended from extensions or arms 25 which reach inwards from the truck. Said cradle is provided with a floor or platform 26 which carries the pumping unit and related mechanisms, and the cradle as an entirety is so swung that it may swing back and forth about the pivotal points 27 towards and from the truck axle. There is provided an extension 28 which is connected to the cradle by means of a spring connection including a rod 29 and spring 30 which tend to draw the cradle to the right in Figure 1 and away from the truck.

The cradle carries the pump which is driven by a pulley 31, and said pulley is in turn driven by means of a belt 32 which passes over a pulley 33 on the near axis of the truck. In this case it will be noted that the pump shaft lies parallel to the axle, and across the width of the car body.

The pumping unit also includes cooling coils such as 34, and these are located on the cradle; and there is also located on the cradle a tank within which the liquefied gas is received and retained as the same is delivered from the cooling coil or coils 34. The tube or pipe 22 for delivering the liquefied gas to the refrigerating unit connects into this tank on the cradle, and the return or expanded gas tube or pipe 23 connects back to the intake side of the pumping unit. These connections from the tubes or pipes 22 and 23 to the respective devices on the cradle are effected by means of flexible connections 35 and 36 respectively so that the necessary truck movements may take place without disturbance to the tubes or pipes on the car body itself, and at the same time the necessary tightness of the connections is maintained.

As shown in Figure 2 the tubes or pipes 22 and 23 are preferably sealed into the end of the tank by soldering or welding so that the tank itself is perfectly tight and the vapors and gases within the tank cannot escape, and also the tank is able to retain pressure if need be.

Figure 3:
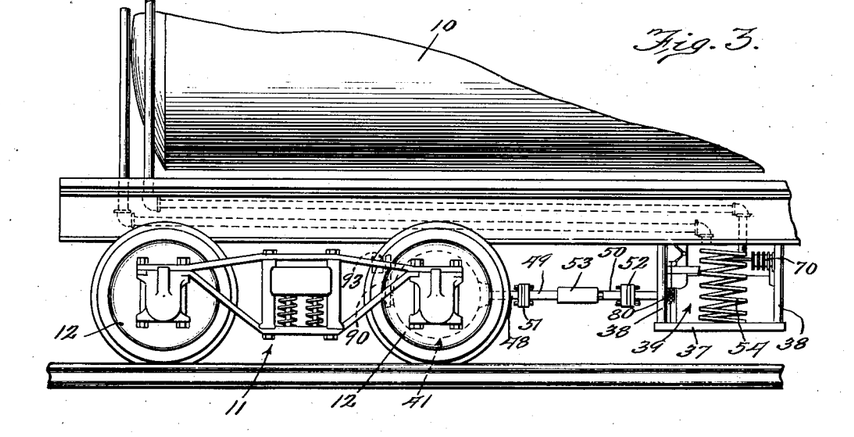
Figure 3 shows a detailed elevation of the end portion of a tank car and the truck, with a modified arrangement of the pumping mechanisms, the arrangement of Figure 3 including a pumping mechanism and related parts which are carried by a platform which is directly supported by the bottom of the car body, the pump being driven from the truck axle by means of a bevel gear and drive shaft arrangement with the necessary flexibility of the connections to allow for the truck movements with respect to the car body, etc.
Figure 6:
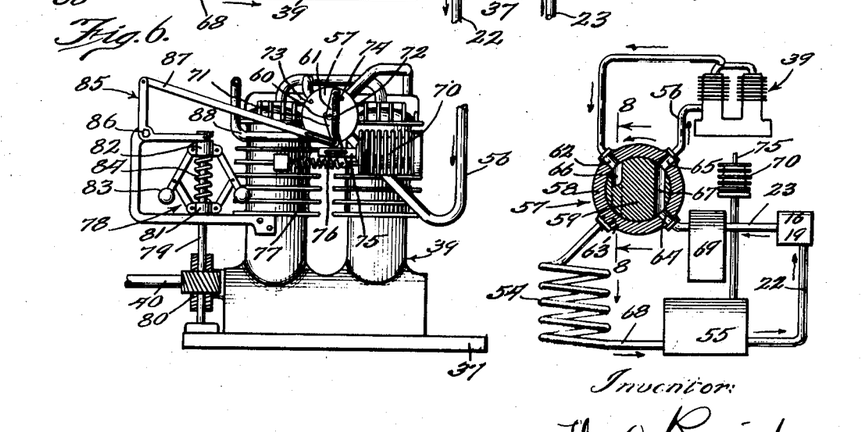
Figure 6 shows a side elevation of the pumping unit of Figures 3 and 4, together with the speed governor arrangement for controlling the "unloading" valve, Figure 6 being on enlarged scale as compared with Figures 3 and 4.

In the arrangement shown in Figure 3 there is provided a platform 37 which is mounted from the bottom of the car body itself, and is suspended therefrom by means of brackets such as 38. This platform is solidly carried by the car body, and does not move with respect thereto, but is rigid therewith. This platform carries the pumping unit including the pump 39; and as shown in Figure 6 in particular, this pump is so placed that its shaft extends across the platform, that is, lengthwise of the car body, and therefore at right angles to the truck axles. This pump is shown at 40. The pump illustrated is a double cylinder pump, but in some cases it will be desirable to use pumps of either greater or less numbers of cylinders.

Mounted on the truck axle nearest to the platform 37 is a housing designated in its entirety by the numeral 41. This housing is split vertically in a direction parallel to the axle, and the two sections are connected together by the screws or bolts 42. Mounted on the axle is a gear member 43. The same is preferably split in a direction lengthwise of the axle, so that said gear member may be assembled into position on the axle without the need of removing one of the wheels from the axle; and the gear member may be keyed or otherwise held in place without slip with respect to the axle. The two sections of the gear member are designated 43$^a$ and 43$^b$. This gear member is also provided with an axial extension 44 which extends lengthwise of the axle a distance sufficient to reach through the housing 41; and the housing itself is preferably journalled on the gear member so that the housing and gear member constitute a unitary structure and the housing may be thus effectively journalled without the need of providing special journals on the axle at both ends of the housing. The housing journals on the gear member are designated 45 and 46 respectively.

Within the housing 41 there is an inward extension 47. A shaft section 48 is extended through the housing and into this extension 47, so that said shaft section 48 is properly journalled both at its inner end and at the point where it passes through the housing 41. This shaft section 48 carries a bevel gear 49 between its journal points, said bevel gear meshing with the bevel gear 43, so that the shaft section 48 is driven by the axle, but with a right angular direction with respect to the axle.

Examination of Figure 3 in particular shows that the pump shaft is substantially on line with the axle, so that the shaft section 48 normally reaches out directly towards the pump shaft 40. There is a drive shaft located between the pump shaft 40 and the shaft section 48. This drive shaft includes the sections 49 and 50, which connect with the shaft section 48 and with the pump shaft 40 by means of the universal or flexible joints 51 and 52 respectively. The drive shaft sections 49 and 50 are connected together by a slip or splined connection 53, which while permitting the shaft sections to elongate or contract in length between the pump and the axle, still maintain the necessary driving connection between the parts. It will thus be seen that the drive connection from the axle to the pump shaft is such that the truck can turn with respect to the car body, or can tilt in either direction, and the truck and car body can shift up and down with respect to each other as needed for the normal travelling of the car in service, and at the same time there is maintained a positive drive from the axle to the pump shaft at all times and under all conditions.

If desired, the slip joint 53 may be protected by a suitable flexible covering such as a piece of leather so as to exclude dirt and dust, etc., and at the same time not interfere with the normal functioning of the device.

The platform 37 also carries a cooling coil or heat exchanger comprising the air cooled coils 54 through which the compressed and hot gas from the pump is passed. For this purpose the delivery side of the pump delivering compressed gas may deliver the same to this heat exchanger without drop of pressure to any appreciable degree. There is also a tank or container for liquefied gas 55 mounted on the platform; and as a matter of convenience the cooling coils may be located to one side of the pump and the tank or receptacle on the other side of the pump, so that a more or less balanced arrangement is provided, and the drive shaft will be located substantially at the center of the device.

The returning connection 36 already referred to connects to intake side of the pump through the pipe 56, (see Figure 6).

There is provided an "unloading" or control valve designated in its entirety by the numeral 57. This valve includes the casing 58 within which there is the rocking plug 59. This plug has the endwise extending stem 60 which carries the arm or crank 61 (see Figures 6 and 10) so that by swinging the arm 61 the plug is turned or rocked to bring the valve into either of its control positions. The delivery pipe or connection for compressed gas coming from the pump connects into the casing at the point 62; from said casing there extends the connection 63 which delivers the compressed gas to the cooling coils or heat exchanger 54; the casing 58 of the valve also has a connection 64 to which the expanded gas from the pipe 36 returns; and the casing also has a connection 65 which connects to the intake or suction side of the pump to deliver the gas thereto for compression. The plug 59 has a passage 66 which reaches through said plug and at the same time extends lengthwise of the plug a certain distance as evident from Figures 7 and 8; and the said plug also has another passage 67 which extends through the plug without change of position lengthwise of the plug, that is, the passage 67 lies within a plane at right angles to the axis of the plug. Examination of Figures 7 and 8 will show that the connections 62, 64 and 65 are all in one plane whereas the connection 63 is in another plane displaced lengthwise of the plug, and therefore the passages 67 and 66 are formed as shown. The arrangement is such that when the plug stands in the normal or working position, which is that shown in Figure 7 the connections 62 and 63 are connected together and the connections 64 and 65 are connected together, so that under these conditions the compressed gas arriving at the connection 62 from the pump will flow through the plug-passage 66 and to the connection 63 and will then be delivered to the cooling coils 54. In these coils said compressed gas will be sufficiently cooled by the air flowing past these coils to cause the compressed gas to liquefy and as such liquid it will collect in the lower portions of the coils 54. From there it will flow through the pipe connection 68 into the tank or container 55 and will collect therein for subsequent delivery to the expansion and cooling or refrigerating mechanisms.

Figures 4, 5, 7, 8:
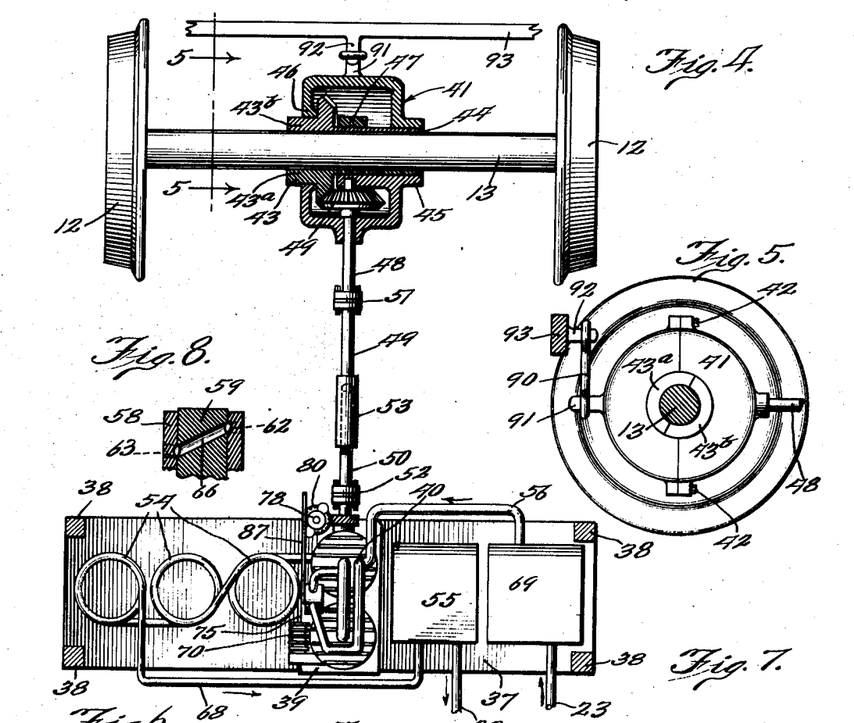
Figure 4 shows a plan view of the pumping mechanism and driving arrangement of Figure 3, but on enlarged scale.
Figure 5 shows a fragmentary section on the line 5—5 of Figure 4, showing the torque arm arrangement for the bevel gear drive.
Figure 7 shows a diagrammatic view of the principal elements of the arrangement, the sylphon for controlling the operation of the "unloading" valve being connected to the storage tank wherein the liquefied gas is contained, and the "unloading" valve being shown in plan section.
Figure 8 shows a section through the "unloading" valve, being taken on the line 8—8 of Figure 7 looking in the direction of the arrows.

On the other hand, when the plug 59 is turned through ninety degrees of rotation the movement being counter-clockwise or according to the arrow of Figure 7, the passage 67 will connect the connections 62 and 65 together, all of said passage and connections being in the same plane at right angles to the axis of the plug; but the passage 66 of the plug will not connect the connections 63 and 64 together. This is because the connections 63 and 64 are respectively at low and high planes when viewed as in Figure 7, and the ends of the passage 66 will be at respectively high and low planes when the plug has been turned as explained above. Thus the delivery and intake sides of the pump will be connected together so that the pump will be in effect short circuited, but the connections 63 and 64 will be sealed from each other and will each be sealed to itself. The result will be that the compressed or liquefied gas contained within the tank 55 will be held therein and the returning expanded gas from the refrigerating or cooling unit will be stopped at the position of the plug valve. Therefore the continued reciprocation of the pump plungers will merely result in displacement of the contained gas back and forth between the inlet and delivery connections of the pump, and there will be no actual pumping operation performed by the pump as long as this condition continues. The power needed to run the pump will therefore be merely that necessary to overcome the mechanical friction of the moving parts.

Generally there will be provided a tank or receptacle 69 in the return gas line before said gas reaches the valve 57. Such tank is conveniently placed on the platform 37 as shown in Figure 6 in particular. The returning expanded gas will collect within this tank 69 before it returns to the pump; and therefore the system may continue to operate or function for a considerable interval of time after the valve 57 is sealed against return of gas to the pump, before the pressure of the return side of the system will become excessive and prevent the system from further functioning in proper manner.

There is a sylphon 70 which is placed in a position convenient with respect to the valve 57. This sylphon is gas tight, but is so constructed that it may expand and contract lengthwise according to the pressure of the contained gas and to which it is subjected. The right hand end of this sylphon when viewed as in Figure 6 is sealed, and is secured against movement. The left-hand of the sylphon is also sealed, but is moveable back and forth. There is an arm or crank 71 having its inner end pivoted on the stem of the valve 60, so that the outer end of said arm may swing back and forth. The other ends of the arms 61 and 71 are connected together by means of a tension spring 72 so that the tendency of said spring is to throw the arm 61 to one side or the other as the arm 71 is shifted to one side or the other, and when the spring passes dead center. There are provided the pins or stops 73 and 74 for limiting the throw of the arm 61 so that it will move definitely to one position or the other for the proper positions of the valve plug 59.

The sylphon carries a stem 75 which is slotted as shown at 76 to receive a pin on the arm 71. A spring 77 tends to move the stem 75 and sylphon back against the contained gas pressure, but the sylphon is able to overcome the force of this spring and force the stem and the arm 71 over when the pressure within the sylphon rises sufficiently according to the intended operation. The sylphon in the arrangement of Figure 7 is connected to the tank or container 55 and is therefore subjected to the pressure within the same. As this pressure rises the sylphon will finally be able to overcome the force of the spring 77 and when this takes place the arm 71 will move over and then the arm 61 will snap over with corresponding shift of the valve plug position to that in which the pump is "unloaded" and in which the connections 63 and 64 are sealed as explained herein. Contrarily, when the pressure within the tank 55 falls due to depletion of gas therefrom, the force of the sylphon will fall, and presently the spring 77 will overpower the sylphon and then the position of the valve plug will be reversed in the very evident manner.

From the above it is evident that the positions of the valve 57 will depend on the pressure within the tank 55, and that therefore the device will function automatically to maintain the pressure of the tank 55 at the desired amount within the limits of variation permitted by the detailed construction adopted.

There is a speed governor designated in its entirety by the numeral 78. It includes a vertical shaft 79 which is driven by the drive shaft through the medium of the spiral gears 80. Therefore the speed of the governor will be in exact proportion to the speed of the truck axle, and therefore the car speed. This governor has the fixed collar 81 on the shaft 79, and the vertically moveable collar 82 on said shaft, said collars being connected together by means of the fly-ball arrangement 83 of familiar form. As the speed falls the balls will move in towards the shaft 79 due to the force of the spring 84 which surrounds the shaft and tends to press the collar 82 upwards, whereas as the speed increases the fly balls will move outwards and thus force the collar 82 down against the force of the spring 84.

There is a bell crank 85 pivoted to a stationary part at the point 86. The horizontal arm of this bell crank is received in a groove of the collar 82, and the vertical arm of the bell crank is connected to the link 87. The other end of this link is slotted as shown at 88 to receive the pin on the arm 71, so that when the link 87 is drawn towards the left it will eventually also operate on the arm 71 and thus also operate on the valve plug.

With the foregoing arrangement, when the speed of the car is less than the proper amount for delivering compressed gas, the spring 84 raises the collar 82 to such a point that the bell-crank is rocked so as to draw the link 87 to the left sufficiently to cause the slot 88 to draw the pin of the arm 71 over to the left. This will swing the arm 71 to the left and thereby cause the valve arm 61 to be snapped to the left with movement of the valve to the "unloading" position. Such operation will be effected irrespective of the pressure existing with the tank 55, and therefore this control is effected every time the speed falls below the proper rate, and irrespective of the pressure condition existing in the gas system.

It will be noted that due to the presence of the slot 88 in the link 87 it is possible for the sylphon 70 to effect movement of the valve plug to the "unloading" position when the pressure condition in the gas system reaches the actuating amount and irrespective of the speed of the car. Therefore the arrangement disclosed is one in which either the speed or the pressure will move the valve to the "unloading" position, depending on which of these conditions is encountered. There is therefore assurance of proper functioning of the system at all times, and for either condition.

Figure 9:
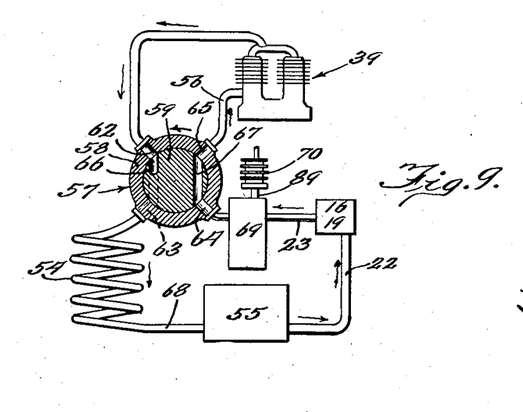
Figure 9 shows a view similar to that of Figure 7 but it illustrates a modified arrangement in which the sylphon is connected to the return or expanded gas side of the system.
Figure 10:
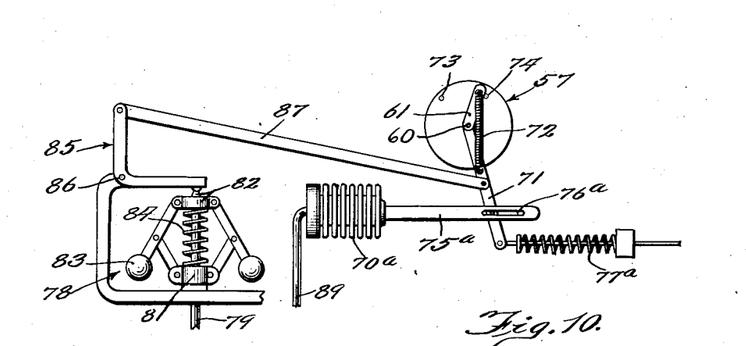
Figure 10 shows a modified arrangement of the speed governor for properly cooperating with the sylphon in the arrangement of Figure 9.

In the arrangement shown in Figures 9 and 10, there is established connection of the sylphon to the return or low pressure side of the gas system. For this purpose the sylphon 70$^a$ is connected to the tank or container 69 by means of the connection 89 so that the sylphon is expanded more and more as the pressure builds up on the return side of the system, that is, due to accumulation of expanded gas which is returning from the cooling unit. This sylphon is connected to the stem 75ª which is slotted as shown at 76ª, and the sylphon in this case tends to move the arm 71 of the valve plug to the open or normal position instead of to the "unloading" position as in the previous case. The spring 77ª tends to move the arm 71 to the "unloading" position against the force of the sylphon. With this arrangement, when the pressure on the return side of the system reaches a predetermined amount the sylphon expands against the force of the spring and moves the arm 71 over far enough to cause the valve stem to be snapped over to the normal position which is the position shown in Figure 7. The pump then commences to draw the gas from the tank 69 and deliver it compressed to the heat exchanger or cooling coils 54 and thence to the tank or receptacle 55. The pressure in the latter will then build up, and the pressure in the tank or receptacle 69 will fall, until finally the pressure within the sylphon 70ª will not be able to withstand the force of the spring 77ª and the valve plug will be snapped back to the "unloading" position.

In the case of the arrangement of Figures 9 and 10, the speed governor 78 functions to move the bell-crank 85 in a manner similar to that explained with respect to Figures 6 and 7. In the present case, however, the horizontal arm of the bell-crank merely rests on the top of the collar 82, and the link 87 may be definitely connected to the arm 71 without the need of a pin and slot arrangement.

Examination of Figures 9 and 10 will show that the arrangement will function as follows:

When the speed of the car falls below the proper rate the fly-balls of the governor will move inwards due to the force of the spring 84, and the collar 82 will be raised. This will move the link 87 to the left and will draw the arm 71 over to the left until finally the valve plug will be snapped to the "unloading" position. In so doing it will be understood that the force of the spring 84 of the governor plus the force of the spring 77ª will overcome the force of the sylphon due to gas pressure existing within the sylphon, so that the reduction of car speed will predominate and will control the position of the valve plug. When the car speed again rises sufficiently, the collar 82 of the fly-ball governor will be drawn down and will draw away from the bell-crank arm, allowing the bell-crank to assume such position as is dictated by the arm 71 acting through the link 87. The arm 71 will then assume such position as is dictated by the pressure of the gas within the sylphon 70ª acting against the force of the spring 77ª.

It will also be seen that, when the car is running at a speed greater than the cutting out rate, the arm 71 is free to move back and forth under the dictation of the sylphon 70ª and the spring 77ª so that the functioning of the "unloading" valve will be controlled by the pressure on the return side of the system, and such control will continue as long as the car speed remains above the cutting out speed.

It will thus be seen that I have provided means for discontinuing the effective pumping action either by the functioning of the gas system itself, or by the reduction of car speed below that which is predetermined, so that the effective pumping action is properly controlled in either case, and also that I have provided arrangements which are effective to accomplish the foregoing functions either in the case of an arrangement in which the pressure on the liquid gas side of the system is used for control, or an arrangement in which the pressure on the return or expanded gas side of the system is used to control. In either such case the speed of the car also is effective to cut out the effective pumping action when the car speed falls below the predetermined rate.

Insofar as the means for controlling the effective pumping action is concerned, it will be noted that the same includes an "unloading" valve in which the "unloading" operation is performed by short-circuiting the pumping action of the pump on itself, so that, although the pump continues to function in the sense that the pistons continue to move up and down, still such movement is ineffective for the reason that the gas delivered on each "working stroke" merely returns immediately to the intake side of the pump. There is no development of pressure since the delivery of the gas is not against pressure, and there is no work expended in the operation beyond that needed to overcome the mechanical friction of the pump itself.

Furthermore, the arrangement is such that the intake and delivery sides of the pump do not communicate with the outside atmosphere, and therefore there is no loss of the refrigerating medium, be it ammonia, sulphur dioxide, carbon dioxide, or other gas, and there is no introduction of air into the system. In fact the arrangement merely constitutes a portion of the closed circuit system, so that the refrigerating medium is not lost or contaminated.

In order to resist the tendency of the housing 41 on the axle to rotate with the axle during the delivery of power to the drive shaft I have provided a torque arm connection between said housing and a suitable part of the truck frame. This is the link 90 extending between the finger 91 on the housing 41 and the finger 92 on the truck frame 93. This link is able to resist the rotation of the housing 41 in either direction.

It should also be noted that the pumping unit should be such as is able to function properly for the pumping action with rotation in either direction. Pumps of the type in which the valves are spring seated are capable of such operation, since the operations of their valves depend on the gas pressure itself, and this is true of both the inlet and delivery valves which will properly seat against flow of gas in the return direction. The inlet valves will seat against back flow of gas from the cylinders to the inlet passage or connection, and the delivery valves will seat against back flow of gas from the delivery passage or connection to the cylinders. Therefore such pumps can operate properly for the pumping action irrespective of the direction of rotation. This is desirable for the reason that the refrigerating system must function properly for either direction of car travel, and therefore for either direction of rotation.

It is also to be noted that when the refrigerating system is applied to case of tank cars for the transportation of such liquids as gasoline, etc., it is desirable to prevent the gas of the refrigerating system from coming into actual contact or admixture with the vapors or material within the tank car. By using a closed system of refrigeration such as that herein set forth there is no commingling of the refrigerating medium with the vapors and material being transported within the tank, so that the refrigerating medium may be selected according to the desires of the designer.

In some cases it will be desirable to use such a material as carbon dioxide or other non-inflammable gas for the refrigerating medium, so that in case of leakage of the said gas into the interior of the tank car there will not be danger of inflammation. Therefore I contemplate as a refrigerating medium for the present use, carbon dioxide or other non-inflammable and non-damaging gas for the closed circuit system.

While I have herein shown and described only certain embodiments of my invention, still I do not intend to limit myself thereto except as I may do so in the claims.

I claim:

1. The combination with a car having a body and trucks, provided with the usual axles and wheels, of means for refrigerating the car body comprising a pumping unit, a cooling coil, and a receptacle for storage of compressed liquefied gas mounted rigidly on the car body, an expansion valve and cooling unit also mounted on the car body in position to refrigerate a selected portion of said body, connections between the pumping unit, the cooling coil and the receptacle for delivery of compressed and cooled gas into the receptacle, connections between the receptacle the expansion valve and cooling unit, and the return side of the pumping unit for delivery of compressed gas from the receptacle to the expansion valve and cooling unit, and from the expansion valve and cooling unit back to the inlet side of the pumping unit for return of expanded gas back to the pumping unit for recompression thereby, and means for driving the pumping unit directly from a truck axle, whereby the driving of said pumping unit is concurrent with the travel of the car so that the pumping ability is determined by car travel, and the receptacle for compressed and cooled gas being of capacity to supply such compressed and cooled gas to the expansion valve and cooling unit according to the needs of said parts and irrespective of periods of travel and rest of the car in normal service, substantially as described.

2. The combination with a car having a body and trucks, provided with the usual axles and wheels, of means for refrigerating the car body comprising a pumping unit, a cooling coil, and a receptacle for storage of compressed liquefied gas carried by the car, an expansion valve and cooling unit also carried by the car in position to refrigerate a selected portion thereof, connections between the pumping unit, the cooling coil and the receptacle for delivery of compressed and cooled gas into the receptacle, connections between the receptacle and the expansion valve and cooling unit, and the return side of the pumping unit for delivery of compressed gas from the receptacle to the expansion valve and cooling unit, and from the expansion valve and cooling unit back to the inlet side of the pumping unit for return of expanded gas back to the pumping unit for recompression thereby, and the receptacle for compressed and cooled gas being of capacity to supply such compressed and cooled gas to the expansion valve and cooling unit according to the needs of said parts and irrespective of periods of travel and rest of the car in normal service, substantially as described.

3. The combination with a car having a body and trucks, provided with the usual axles and wheels, of means for refrigerating the car body comprising a pumping unit, a cooling coil, and a receptacle for storage of compressed and liquefied gas carried by the car, an expansion valve and cooling unit also carried by the car in position to refrigerate a selected portion thereof, connections between the pumping unit, the cooling coil and the receptacle for delivery of compressed and cooled gas into the receptacle, connections between the receptacle and the expansion valve and cooling unit, and the return side of the pumping unit for delivery of compressed gas from the receptacle to the expansion valve and cooling unit, and from the expansion valve and cooling unit back to the inlet side of the pumping unit for return of expanded gas back to the pumping unit for recompression thereby, and means for driving the pumping unit concurrently with travel of the car so that the pumping ability is determined by the car travel, and the receptacle for compressed and cooled gas being of capacity to supply such compressed and cooled gas to the expansion valve and cooling unit according to the needs of said parts and irrespective of periods of travel and rest of the car in normal service, substantially as described.

4. The combination with a car having a body and trucks, provided with the usual axles and wheels, of means for refrigerating the car body comprising a pumping unit, a cooling coil, and a receptacle for storage of compressed liquefied gas mounted rigidly on the car body, an expansion valve and cooling unit also mounted on the car body in position to refrigerate a selected portion of said body, permanent and relatively non-flexible connections between the pumping unit, the cooling coil and the receptacle for delivery of compressed and cooled gas into the receptacle, permanent and relatively non-flexible connections between the receptacle the expansion valve and the cooling unit, and the return side of the pumping unit for delivery of compressed gas from the receptacle to the expansion valve and cooling unit, and from the expansion valve and cooling unit back to the inlet side of the pumping unit for return of expanded gas back to the pumping unit for recompression thereby, and means for driving the pumping unit from the car axle comprising a drive shaft connected at one end to the pumping unit and gear connections between the other end of said drive shaft and the truck axle, universal joints in said drive shaft, and a slip joint in the drive shaft, whereby the driving of the pumping unit is effected at all times from the truck axle with compensation for movements between the truck and the car body, and whereby the connections for compressed and for expanded gas are permanent and relatively non-flexible, to thereby assure gas-tight condition of said connections at all times, substantially as described.

5. The combination with a car having a body and trucks, provided with the usual axles and wheels, of means for refrigerating the car body comprising a pumping unit, cooling means, a receptacle for storage of compressed liquefied gas, an expansion valve and a cooling unit all located on the car body and substantially rigid therewith, and adapted to refrigerate a selected portion of the car body, permanent and relatively non-flexible connections between the pumping unit, the cooling means, the receptacle, the expansion valve and the cooling unit, for transfer of the gas in closed circuit fashion through the said parts in the proper order of movement, all of said parts and connections being substantially rigid with respect to each other and being substantially rigid with respect to the car body on which they are mounted, and means for driving the pumping unit from one of the truck axles, comprising a drive shaft having one end connected to the pumping unit and gear connections between the other end of said drive shaft and the axle to drive said shaft, said drive shaft including universal joints and a connection capable of lengthwise extension, whereby the pumping unit is driven by the axle aforesaid while providing for relative movements between the truck and the car body during normal travel, substantially as described.

6. The combination with a car having a body and trucks, provided with the usual axles and wheels, of means for refrigerating the car body comprising a pumping unit for compressing the gaseous refrigerating medium, a cooling unit for refrigerating the desired portion of the car body, and closed circuit connections between the said parts effectively to supply compressed refrigerating medium from the pumping unit to the cooling unit, and back from the refrigerating cooling unit to the pumping unit, all of said parts being mounted substantially rigid with respect to the car body, and the connections being permanent and relatively non-flexible, and means for driving the pumping unit from one of the truck axles, said means comprising a drive shaft drivingly connected at one end to the pumping unit, and drivingly connected at the other end to the axle, and universal joints and an extension joint in said drive shaft permitting relative movements between the truck and the car body during normal service of the car, while maintaining driving connection from the axle to the pumping unit, substantially as described.

7. The combination with a car having a body and trucks, provided with the usual axles and wheels, of means for refrigerating the car body comprising a pumping unit for compressing the gaseous refrigerating medium, a cooling unit for refrigerating the desired portion of the car body, and closed circuit connections between said parts effectively to supply compressed refrigerating medium from the pumping unit to the cooling unit, and back from the cooling unit to the pumping unit, a drive shaft, driving connections between one end of said shaft and the pumping unit, driving connections between the other end of said shaft and the truck axle, whereby the operation of the pumping unit is effected by rotation of the axle, a valve, connections between said valve and the closed circuit aforesaid permitting movement of the refrigerating medium normally through said circuit between the pumping unit and the cooling unit when the valve is in one position and permitting circulation of the refrigerating medium back and forth through the pumping unit without compressing action when the valve is in another position to thereby "unload" the pumping unit, means for moving the valve to the "unloading" position when the refrigerating circuit is replenished with refrigerating medium for refrigerating function, and means for moving the valve to the "unloading" position when the speed of the drive shaft is less than a predetermined rate, substantially as described.

8. The combination with a car having a body and trucks, provided with the usual axles and wheels, of means for refrigerating the car body comprising a pumping unit for compressing the gaseous refrigerating medium, a cooling unit for refrigerating the desired portion of the car body, a valve having connections for incoming compressed gas, for outgoing compressed gas, for incoming expanded gas, and for outgoing expanded gas, connections between said valve connections and the pumping unit and the cooling unit effectively to cause gas from the pumping unit to enter the valve at one point and to cause gas from the cooling unit to enter the valve at another point, a plug within the valve, passages within said plug effectively to cause the gas entering the valve from the pumping unit to deliver to the cooling unit when the plug is in one position and to cause the gas entering the valve from the cooling unit to deliver to the pumping unit when the valve is in said position, and effective to cause the gas entering the valve from the pumping unit to return to the pumping unit when the plug is in another position and to seal the cooling unit connections when the plug is in said position, means for driving the pumping unit from the truck axle, whereby the speed of pumping operation depends on the car speed, a speed governor connected to the driving connections aforesaid, and connections between said speed governor and the valve plug effectively to move the valve plug to the last mentioned position when the car speed is less than a predetermined rate, substantially as described.

9. The combination with a car having a body and trucks, provided with the usual axles and wheels, of means for refrigerating the car body comprising a pumping unit for compressing the gaseous refrigerating medium, a cooling unit for refrigerating the desired portion of the car body, a valve, connections between the delivery and inlet sides of the pump and said valve, connections between said valve and the gas supply and return sides of the cooling unit, said valve being suitably formed and serving when in one position to deliver compressed gas from the pumping unit to the supply side of the cooling unit and to permit return of expanded gas from the delivery side of the cooling unit to the intake side of the pumping unit, and when in another "unloading" position serving to connect the delivery and inlet sides of the pumping unit directly together to thereby "unload" the pumping unit, and when in said position serving to seal the supply and return sides of the cooling unit, means for driving the pumping unit by rotation of a truck axle, pressure responsive means in connection with the cooling unit, speed governor means in connection with the driving connection aforesaid, and connections between the pressure responsive means and the speed governor means and the valve effectively to move the valve to the "unloading" position when the pressure in the cooling unit is normal and for moving the valve to the "unloading" position when the speed is less than a pre-determined rate, substantially as described.

10. The combination with a car having a body and trucks, provided with the usual axles and wheels, of means for refrigerating the car body comprising a pumping unit for compressing the gaseous refrigerating medium, a cooling unit for refrigerating the desired portion of the car body, a valve, connections between the delivery and inlet sides of the pump and said valve, connections between said valve and the gas supply and return sides of the cooling unit, said valve being suitably formed and serving when in one position to deliver compressed gas from the pumping unit to the supply side of the cooling unit and to permit return of expanded gas from the delivery side of the cooling unit to the intake side of the pumping unit, and when in another "unloading" position serving to connect the delivery and inlet sides of the pumping unit directly together to thereby "unload" the pumping unit, and when in said position serving to seal the supply and return sides of the cooling unit, means for driving the pumping unit by rotation of a truck axle, speed governor means in connection with the driving connection aforesaid, and connections between the speed governor means and the valve effectively to move the valve to the "unloading" position when the speed is less than a pre-determined rate, substantially as described.

11. The combination with a car having a body and trucks, provided with the usual axles and wheels, of means for refrigerating the car body comprising a pumping unit for compressing the gaseous refrigerating medium, a cooling unit for refrigerating the desired portion of the car body, a valve, connections between the delivery and inlet sides of the pump and said valve, connections between said valve and the gas supply and return sides of the cooling unit, said valve being suitably formed and serving when in the loading position to deliver compressed gas from the pumping unit to the supply side of the cooling unit and to permit return of expanded gas from the delivery side of the cooling unit to the intake side of the pumping unit, and when in another "unloading" position serving to connect the delivery and inlet sides of the pumping unit directly together to thereby "unload" the pumping unit, and when in said position serving to seal the supply and return sides of the cooling unit, means for driving the pumping unit by rotation of a truck axle, pressure responsive means in connection with the cooling unit, and connections between the pressure responsive means and the valve effectively to move the valve to the "unloading" position when the pressure in the cooling unit is normal and for moving the valve to its loading position when the pressure in the cooling unit is not normal, substantially as described.

12. The combination with a car having a body and trucks, provided with the usual axles and wheels, of means for refrigerating the car body comprising a pumping unit for pumping the refrigerating medium, a cooling unit for refrigerating the desired portion of the car body, closed circuit connections between the pumping unit and the cooling unit for transfer of compressed gaseous refrigerating medium from the pumping unit to the cooling unit and for return of expanded gaseous refrigerating medium from the cooling unit back to the pumping unit, valve means for controlling all of said connections, said valve means having a loading position and an "unloading" position, and serving when in the loading position to establish normal closed circuit flow of the gaseous refrigerating medium between the pumping and cooling units, and serving when in the "unloading" position to short-circuit the delivery and inlet sides of the pumping unit on themselves and to seal the supply and return sides of the cooling unit, means for positively driving the pumping unit from a truck axle, pressure means responsive to pressure in the cooling unit, a speed governor responsive to the speed of the truck axle, and connections between said pressure responsive and speed responsive devices and the valve effectively to move the valve to the "unloading" position when the pressure conditions in the cooling unit are normal or when the speed is less than a pre-determined amount, and effective to move the valve to the loading position when the pressure in the cooling unit is not normal and the speed is greater than a predetermined amount, substantially as described.

13. The combination with a car having a body and trucks, provided with the usual axles and wheels, of means for refrigerating the car body comprising a pumping unit for pumping the refrigerating medium, a cooling unit for refrigerating the desired portion of the car body, closed circuit connections between the pumping unit and the cooling unit for transfer of compressed gaseous refrigerating medium from the pumping unit to the cooling unit and for return of expanded gaseous refrigerating medium from the cooling unit back to the pumping unit, valve means for controlling all of said connections, said valve means having a loading position and an "unloading" position, and serving when in the loading position to establish normal closed circuit flow of the gaseous refrigerating medium between the pumping and cooling units, and serving when in the "unloading" position to short-circuit the delivery and inlet sides of the pumping unit on themselves and to seal the supply and return sides of the cooling unit, means for positively driving the pumping unit from a truck axle, a speed governor responsive to the speed of the truck axle, and connections between said governor, driving means and the valve effectively to move the valve to the "unloading" position when the speed is less than a predetermined amount, and effective to move the valve to the loading position when the speed is greater than a predetermined amount, substantially as described.

14. The combination with a car having a body and trucks, provided with the usual axles and wheels, of means for refrigerating the car body comprising a pumping unit for pumping the refrigerating medium, a cooling unit for refrigerating the desired portion of the car body, closed circuit connections between the pumping unit and the refrigerating unit for transfer of compressed gaseous refrigerating medium from the pumping unit to the cooling unit and for return of expanded gaseous refrigerating medium from the cooling unit back to the pumping unit, valve means for controlling all of said connections, said valve means having a loading position and an "unloading" position, and serving when in the loading position to establish normal closed circuit flow of the gaseous refrigerating medium between the pumping and cooling units, and serving when in the "unloading" position to short-circuit the delivery and inlet sides of the pumping unit on themselves and to seal the supply and return sides of the cooling unit, means for positively driving the pumping unit from a truck axle, pressure means responsive to the pressure in the cooling unit, and connections between said pressure responsive devices and the valve effectively to move the valve to the "unloading" position when the pressure conditions in the cooling unit are normal, and effective to move the valve to the loading position when the pressure in the cooling unit is not normal, substantially as described.

15. The combination with a car having a body and trucks, provided with the usual axles and wheels, of means for refrigerating the car body by the use of gaseous refrigerating medium, said refrigerating means including pumping means for compressing the gaseous medium, a driving connection between a truck axle and said pumping means, inlet and delivery connections for gaseous refrigerating medium entering and delivered from the pumping means, a valve in conjunction with said connections and serving when in one position to permit normal or loading functioning of the pumping means for the compressing operation and serving when in another position to connect the inlet and delivery connections of the pumping means directly together to short-circuit them for the "unloading" function, a pressure responsive device in connection with the refrigerating system, a speed responsive device in connection with the driving connection, and means for moving the valve aforesaid to the "unloading" position when the pressure is normal and when the speed is greater than a pre-determined rate, substantially as described.

16. The combination with a car having a body and trucks, provided with the usual axles and wheels, of means for refrigerating the car body by the use of gaseous refrigerating medium, said refrigerating means including pumping means for compressing the gaseous medium, a mechanical driving connection between a truck axle and said pumping means, inlet and delivery connections for gaseous refrigerating medium entering and delivered from the pumping means, a valve in conjunction with said connections and serving when in one position to permit normal or loading functioning of the pumping means for the compressing operation and serving when in another position to connect the inlet and delivery connections of the pumping means directly together to short-circuit them for the "unloading" function, a pressure responsive device in connection with the refrigerating system, and operative connections therefrom to the valve effective to move said valve to the "unloading" position when the pressure in the system is normal and to move the valve to the loading position for pumping operations when the pressure is not normal, substantially as described.

17. The combination with a car having a body and trucks, provided with the usual axles and wheels, of means for refrigerating the car body by the use of gaseous refrigerating medium, said refrigerating means including pumping means for compressing the gaseous medium, a driving connection between a truck axle and said pumping means, inlet and delivery connections for gaseous refrigerating medium entering and delivered from the pumping means, a valve in conjunction with said connections and serving when in one position to permit normal functioning of the pumping means for the compressing operation and serving when in another position to connect the inlet and delivery connections of the pumping means directly together to short-circuit them for the "unloading" function, a speed governor device in connection with the pumping means and axle, and connections from said speed governor device to the valve operative effectively to move the valve to the "unloading" position when the speed is less than a predetermined amount, pressure control means associated with said speed control to operate the valve independently of car speed, and means for moving the valve to the normal position when the speed exceeds such amount, substantially as described.

18. The combination with a car having a body and trucks provided with the usual axles and wheels, of means for refrigerating the car body by the use of a gaseous refrigerating medium, and including pumping means for said gaseous medium, means for driving said pumping means by travel of the car and at a rate proportionate to the rate of travel of the car, a speed governor in connection with a part whose speed is proportionate to the speed of car travel, and means under control of said speed governor operative effectively to discontinue effective pumping action when the car speed is less than a pre-determined amount, pressure control means associated with said speed control to operate the valve independently of car speed, and means to move the valve for effective pumping action when the car speed exceeds such amount, substantially as described.

19. The combination with a car having a body and trucks provided with the usual axles and wheels, of means for refrigerating the car body by the use of a gaseous refrigerating medium, and including pumping means for said gaseous medium, means for driving said pumping means by travel of the car and at a rate proportionate to the rate of travel of the car, a speed governor in connection with a part whose speed is proportionate to the speed of car travel, and means under control of said speed governor operative effectively to "unload" the pumping means when the car speed is less than a predetermined amount, pressure control means associated with said speed control to operate the valve independently of car speed, and means to move the valve for the pumping action when the car speed exceeds such amount, substantially as described.

20. The combination with a car having a body and trucks provided with the usual axles and wheels, of means for refrigerating the car body by the use of a gaseous refrigerating medium, and including pumping means for said gaseous medium, means for driving said pumping means by travel of the car and at a rate proportionate to the rate of travel of the car, a speed governor in connection with a part whose speed is proportionate to the speed of car travel, and means under control of said speed governor serving to relieve the gas pressure of the compressor due to movement of said pumping means when the car speed is less than a predetermined amount, pressure control means associated with said speed control to operate the valve independently of car speed, and means to move the valve for the normal pumping function when the car speed exceeds such amount, substantially as described.

21. The combination with a car having a body and trucks provided with the usual axles and wheels, of means for refrigerating the car body including pumping means, means for driving said pumping means by travel of the car and at a rate proportional to the rate of travel of the car, means separate from said driving means for controlling the pumping means independently of car movement, and means functioning according to the rate of travel of the car for discontinuing the pumping function when the rate of travel is less than a predetermined rate, substantially as described.

22. The combination with a car having a body and trucks provided with the usual axles and wheels, of means for refrigerating the car body including pumping means, means for driving said pumping means by travel of the car, means separate from said driving means for controlling the pumping means independently of car movement, and means functioning according to the rate of travel of the car for discontinuing the pumping action when the rate of travel is less than a predetermined rate, substantially as described.

23. The combination with a car having a body and trucks provided with the usual axles and wheels, of means for refrigerating the car body including pumping means, means for driving said pumping means by energy derived from car travel, means separate from said driving means for controlling the pumping means independently of car movement, and means functioning according to rate of travel of the car for discontinuing the pumping function when the rate of travel is less than a predetermined rate, substantially as described.

THOS. A. BANNING, Jr.